us006225709B1

United States Patent
Nakajima

(10) Patent No.: US 6,225,709 B1
(45) Date of Patent: May 1, 2001

(54) POWER SUPPLY CIRCUIT FOR ELECTRIC DEVICE

(75) Inventor: Hiroshi Nakajima, Lebanon (IL)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/393,266

(22) Filed: Sep. 10, 1999

(30) Foreign Application Priority Data

Sep. 11, 1998 (JP) .................................................. 10-258697

(51) Int. Cl.[7] ...................................................... H04N 5/63
(52) U.S. Cl. ............................................. 307/66; 307/116
(58) Field of Search .............................. 307/43, 64, 66, 307/85, 112, 113, 116, 130

(56) References Cited

U.S. PATENT DOCUMENTS

| 5,384,491 | * | 1/1995 | Suizi | 307/113 |
| 5,477,279 | | 12/1995 | Chang | 348/730 |
| 6,107,698 | * | 8/2000 | Ochiai et al. | 307/64 |

FOREIGN PATENT DOCUMENTS

| 9410498 | 10/1994 | (DE) . |
| 19500409 | 5/1996 | (DE) . |
| 0610700 | 8/1994 | (EP) . |
| 2265776 | 10/1993 | (GB) . |
| 7-95496 | 4/1995 | (JP) . |
| 93/09634 | 5/1993 | (WO) . |

* cited by examiner

Primary Examiner—Stephen W. Jackson
Assistant Examiner—Rios Roberto
(74) Attorney, Agent, or Firm—Pillsbury Winthrop LLP

(57) ABSTRACT

An electric device having a main power supply switch 14-1 and a stand-by switch 7 is configured so that a second switch 14-2 having the same polarity as that of the switch 14-1 is provided so as to operate in an interlocked manner with the main power supply switch 14-1 which turns ON/OFF the commercial power source. When the main power supply switch 14-1 is turned off, a microcomputer 8A detects and stores the turning off of the second switch 14-2 while the output voltage Vcc of the stand-by power supply circuit 10 for the microcomputer falls slowly with a time constant. Consequently, no matter when the main power supply switch 14-1 is turned off, either in the operation status or in the stand-by status, the microcomputer 8A is able to put an electric device into the operation status without fail when the main power supply switch 14-1 is turned on again. Moreover, an electric device can automatically be set to the stand-by status when a power failure occurs and the power is restored from the power failure later while the device is either in the stand-by status or in the operation status.

6 Claims, 10 Drawing Sheets

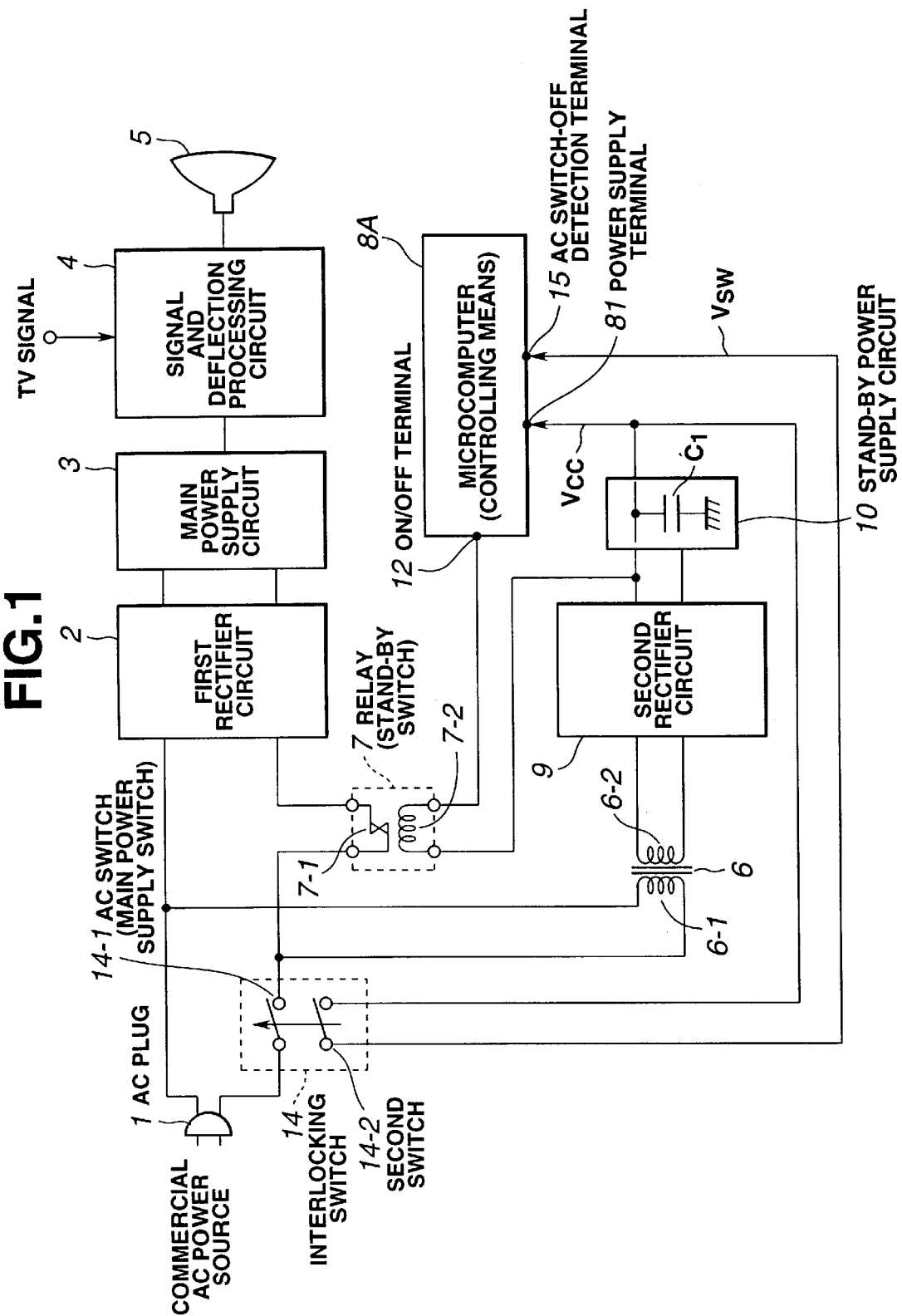

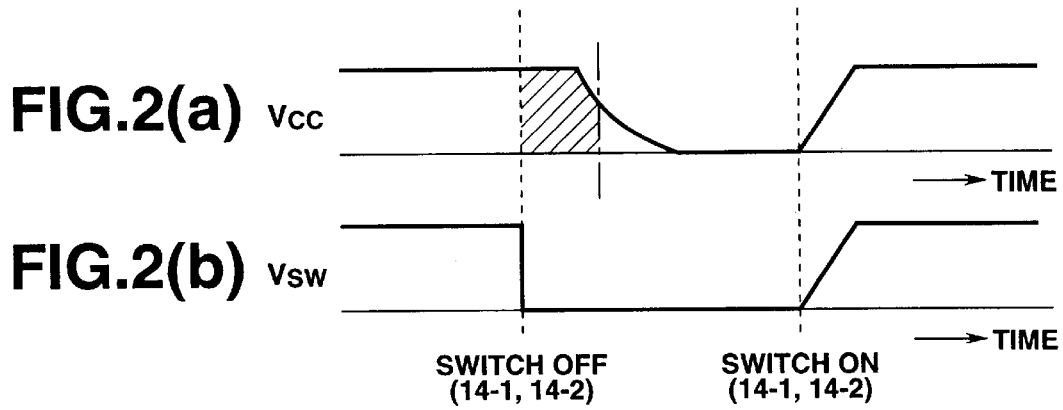
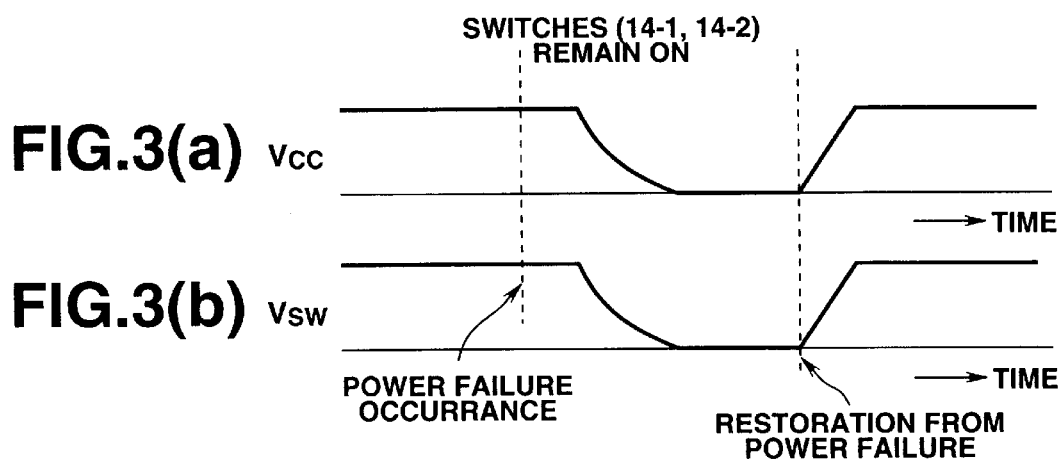
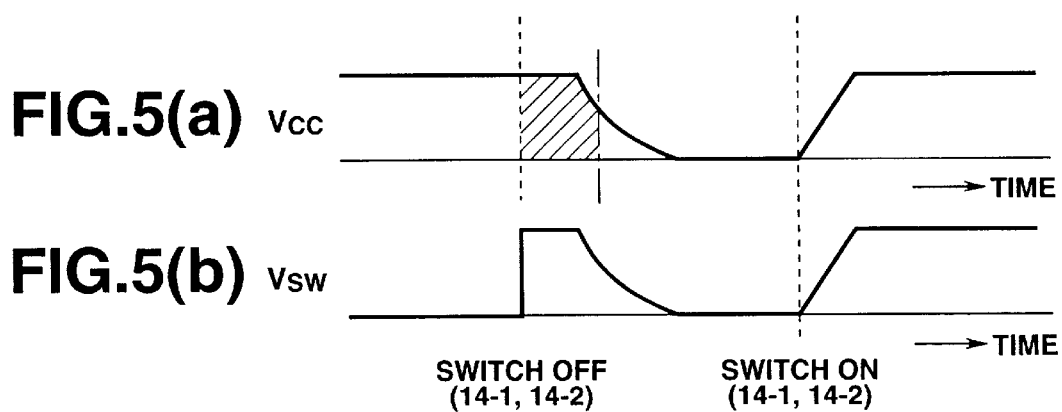

POWER SUPPLY CIRCUIT FOR ELECTRIC DEVICE

BACKGROUND OF THE INVENTION

1. Field of the Invention

The present invention relates to a power supply circuit for an electric device such as a television set which is provided with at least a main power supply switch and controls the operation status and the stand-by status of the electric device according to the turning ON/OFF operation of the main power supply switch and the control operation of a controlling means.

2. Description of the Related Art

Some conventional electric devices such as television sets are designed to supply the power fed from the commercial AC power source to a stand-by power supply circuit, and at the same time, to a main power supply circuit via a stand-by switch. Such an electric device usually supplies the power to a stand-by power supply circuit to make at least a controlling means, such as a microcomputer, operable so that it can be controlled by a remote control transmitter (stand-by status). To actually operate the main circuit of a device, the user manually turns on the stand-by switch or operates the power key on the remote control transmitter to turn on the stand-by switch so that the output of the main power supply circuit is supplied to the main circuit to put the device into the operation status.

FIG. 11 is a block diagram showing a power supply circuit for a conventional television set.

In FIG. 11, an AC plug 1 is connected with the commercial alternating current power source (AC), with one line of the AC plug 1 being connected with one input terminal of a first rectifier circuit 2 and the other line being connected with the other input terminal of the first rectifier circuit 2 via a switch 7-1 of a relay 7. The rectified voltage in which the commercial AC voltage is rectified and smoothed is outputted from the first rectifier circuit 2. The rectified voltage is turned into a stabilized DC voltage at a main power supply circuit 3 which is configured with a stabilized power supply circuit, such as a switching type power supply circuit, and supplied to a signal and deflection processing circuit 4 which is the main circuit of a television (TV) set. Video signals and deflection signals from the signal and deflection processing circuit 4 are supplied to a picture tube (CRT) 5.

Meanwhile, the voltage of the commercial AC power source is supplied to a primary winding 6-1 of a stand-by transformer 6, and the output voltage of a secondary winding 6-2 thereof is supplied to a second rectifier circuit 9. The rectified output voltage is supplied to a stand-by power supply circuit 10 which is configured with a stabilized power supply circuit. The output voltage Vcc of the stand-by power supply circuit 10 is supplied to a power supply input terminal 81 of a microcomputer 8 which is a controlling means. The second rectifier circuit 9 outputs a rectified voltage in which AC voltage obtained from the commercial AC power source is rectified and smoothed. The stand-by power supply circuit 10 stabilizes the rectified voltage, and at the same time, converts it into power supply voltage Vcc for microcomputer and outputs it.

Further, an output terminal of said second rectifier circuit 9 is connected with an end of a drive winding 7-2 of the relay 7 via one switch 11-1 of an interlocking switch 11, and the other end of the drive winding 7-2 is connected with an ON/OFF terminal 12 of the microcomputer 8. The interlocking switch 11 is a manually actuated main power supply switch provided with two switches 11-1 and 11-2 which are turned ON/OFF at the same time in an interlocked manner. That is, the turning on or off of one switch 11-1 is designed to be interlocked with turning on or off of the other switch 11-2. The output voltage Vcc of the stand-by power supply circuit 10 is connected with an operation (ON) instruction terminal 82 of the microcomputer 8 via the switch 11-2 in the interlocking switch 11.

With the configuration described above, in a status where the interlocking switch 11 is turned off while the commercial AC power is supplied to the AC plug 1, that is, in the stand-by status, when the interlocking switch 11 is turned on, the voltage Vcc enters a terminal 82 of the microcomputer 8 as an ON signal by turning on of the switch 11-2 of the interlocking switch 11. This causes the terminal 12 of the microcomputer 8 to be connected with a reference potential point in a device, and at the same time, turning on of the switch 11-1 lets the drive current flow from the second rectifier circuit 9 to a reference potential point via the switch 11-1, the drive winding 7-2 and the terminal 12. Consequently, the switch 7-1 of the relay is turned on and a TV set is put in the operation status. Contrarily, when the interlocking switch 11 is turned off in this operation status, the relay switch 7-1 is turned off and the TV set is put into the stand-by status again since the voltage Vcc is not supplied to the operation instruction terminal 82 of the microcomputer 8 and the power supply to the drive winding 7-2 of the relay 7 is turned off.

In order to make the TV set shown in FIG. 11 operable by a remote control transmitter 17, a light receiving circuit 83 is provided in the microcomputer 8. In case of the remote control transmitter operation, when the interlocking switch 11 is turned on to keep a TV set in the operation status, if an operation stoppage (OFF) signal is transmitted from the remote control transmitter 17, the microcomputer 8 receives and decodes this signal, and turns off the connected status (ON) of the ON/OFF terminal 12 with a reference potential point. Consequently, since the drive electric current stops flowing to the winding 7-2 of the relay 7, the switch 7-1 is turned off, putting a TV set into the stand-by status. That is, a TV set can be turned into the stand-by status by the remote control transmitter operation while the interlocking switch 11 is kept tuned on. When it is desired to return a TV set from the stand-by status caused by this remote control transmitter operation back into the operation status through the remote control transmitter operation, the user transmits an operation instruction (ON) signal from the remote control transmitter 17. This signal returns the ON/OFF terminal 12 back into the ON status with a reference potential point to turn on the relay 7, putting the TV set into the operation status. When it is desired to return a TV set from the stand-by status caused by the remote control transmitter operation back into the operation status by manual operation, the user turns off the interlocking switch 11 and turns it on again manually. Then, an operation instruction (ON) signal of voltage Vcc from the stand-by power supply circuit 10 enters into the terminal 82 of the microcomputer 8. This signal returns the terminal 12 back to the ON status to turn on the relay 7, putting the TV set into the operation status.

As described above, so long as the power from the commercial AC power source is supplied to the AC plug 1, a TV set can be put into the operation status by turning on the manual switch 11 no matter which status the TV set is in when the switch 11 is turned off, either in the operation status or in the stand-by status.

However, the configuration shown in FIG. 11 has a problem that electricity is supplied from the stand-by power supply circuit 10 to the microcomputer 8 as long as a TV set is connected with the commercial power source and electric power, even in small amount, is consumed because some power is necessary to keep the microcomputer 8 working even while the switch 11 is turned off.

There is another example of conventional electric devices such as TV sets in which electric power fed from the commercial AC power source is supplied via the main power supply switch to a power supply circuit where various power source voltages are generated. One of the power source voltage is used to keep at least a controlling means operable to stay controllable by a remote control transmitter (stand-by status), and the main circuit is turned on by operating the power key on the remote control transmitter to lead the device to the operation status when the operation of the main circuit of a device is desired.

FIG. 12 is a block diagram showing another example of a conventional TV set. The AC plug 1 is connected with the commercial alternating current power source (AC) and with the rectifier circuit 2 via a double-cut switch 13, which is the main power supply switch, and the rectified output voltage is supplied to a first power supply circuit 3 which is configured with a stabilized power supply circuit. Various power source voltages are generated from the first power supply circuit 3. The stabilized output voltage from the first power supply circuit 3 (e.g. 115 V) is supplied to a signal and deflection processing circuit 4 which is the main circuit of a TV set. Video signals and deflection signals from the signal and deflection processing circuit 4 are supplied to the picture tube (CRT) 5. Another stabilized output voltage from the first power supply circuit 3 (e.g. 5 V) is supplied to a power supply terminal 81 of the microcomputer 8 as a power supply voltage Vcc for microcomputer. Since the microcomputer 8 has been provided with the light receiving circuit 83, it can receive the infrared code signal from the remote control transmitter 17 and decode it. When the remote control transmitter 17 transmits an operation instruction (ON) signal or an operation stoppage (OFF) signal using infrared code, an ON or OFF signal is outputted from the ON/OFF terminal 12 of the microcomputer 8 and supplied to a control terminal of the signal and deflection processing circuit 4. The signal and deflection processing circuit 4 is designed to be turned into the operation status (ON) or the stand-by status (OFF) with this signal.

In the configuration shown in FIG. 12 above, when the commercial AC power source is connected with the AC plug 1 and the double-cut switch 13 is thrown in, the power supply voltage is rectified at the rectifier circuit 2 and the rectified output is stabilized at the first power supply circuit 3 and outputted. One part of the stabilized output (115 V) is supplied to a power supply terminal of the signal and deflection processing circuit 4 as a first power supply voltage, and the other part of the stabilized output voltage Vcc (5 V) is supplied as a second power supply voltage to a power supply terminal of the microcomputer 8 which is a controlling means. At this time, though the microcomputer 8 is in the status where it can operate various operation using supplied power supply voltage, the signal and deflection processing circuit 4 turns into the operation status by the circuit operation only when the ON signal is supplied to a control terminal thereof from an ON/OFF terminal 12 of the microcomputer 8. If the OFF signal is supplied from the ON/OFF terminal 12, the circuit turns into the stand-by status where the circuit operation is stopped. When the operation instruction (ON) signal is transmitted from a remote control transmitter 17, the microcomputer 8 receives this signal and outputs the ON signal from the terminal 12, putting the signal and deflection processing circuit 4 into the operation status. In order to put it into the stand-by status, the operation stoppage (OFF) instruction from the remote control transmitter 17 causes the OFF signal to be supplied from the terminal 12 of the microcomputer 8 to the signal and deflection processing circuit 4 to stop, for example, horizontal oscillation. With this, the operation of deflection circuits and high voltage circuits stops, reducing the power consumption in the main part circuit. Instead of stopping horizontal oscillation, the supply of a first power supply voltage (115 V) to the signal and deflection processing circuit 4 may be stopped.

With the configuration shown in FIG. 12, electric power is not consumed so long as a switch 13 is in the turned-off status. However, it is inconvenient that, when the switch 13 is turned off in the stand-by status of a TV set and the switch 13 is turned on again, the TV set remains in the stand-by status without turning into the operation status unless the turning on operation is done using the remote control transmitter 17 or the like. The configuration in FIG. 12 has an advantage that, when a power failure occurs and the power is restored from the power failure while a TV set is in the stand-by status, the TV set does not turn into the operation status (that is, it is dangerous and also uneconomical if, contrary to the above, a TV set starts operating without turning into the stand-by status after a power failure occurs and the power is restored from it while the set is in the stand-by status, particularly when it happens while the user is absent, leaving the TV set operating with nobody around).

As described above, a conventional television set has a problem that it consumes electric power so long as it is connected with the commercial power source, or it causes inconvenience that turning on of the main power supply switch may keep the TV set in the stand-by status, requiring the turning on operation using a remote control transmitter or the like.

SUMMARY OF THE INVENTION

It is an object of the present invention to provide a power supply circuit for an electric device which leads a device such as a television set to the operation status without remote control transmitter operation when the main power supply switch is turned off in the stand-by status or in the operation status and turned on again, and prevents the electric device from operating when a power failure occurs and the power is restored later.

It is another object of the present invention to provide a power supply circuit for an electric device which enables a main power supply switch to be turned off by the remote control transmitter operation to improve operational efficiency when an electric device is all turned off (power supply is completely turned off).

According to a first invention, a power supply circuit for an electric device having a main power supply switch and a stand-by switch comprises a main power supply switch for turning ON/OFF the electric power which is inputted from a commercial power source; a stand-by switch which is provided in the subsequent stage of said main power supply switch for turning ON/OFF the power supply to a main power supply circuit; a stand-by power supply circuit which is provided in the subsequent stage of said main power supply switch and is able to output a first power supply voltage necessary for a stand-by circuit in an electric device according to the voltage from said commercial power source, and wherein said first power supply voltage falls with a predetermined time constant with turning off of the voltage supply from said commercial power source; controlling means which is included in said stand-by circuit, operated by said first power supply voltage, provided with a signal detection terminal and a control terminal to control said. stand-by switch, and is able to control turning ON/OFF of said stand-by switch according to the control signals from said control terminal; and a second switch which is connected between an output terminal of said stand-by power supply circuit and said signal detection terminal of said controlling means, turned ON/OFF in the manner interlocking with turning ON/OFF of said main power supply switch, amd supplies voltage, which varies with turning ON/OFF of said main power supply switch, to the signal detection terminal of said controlling means, wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls an electric device so as to be put in the operation status by turning on said stand-by switch according to the stored content in said storing means when said main power supply switch is turned on again.

According to a second invention, a power supply circuit for an electric device according to the first invention comprises polarity inverting means for inverting the polarity of voltage which varies with the interlocked operation of said second switch and supplying it to said signal detection terminal of said controlling means when said main power supply switch is turned ON/OFF, wherein said controlling means is able to store the turning off of said main power supply switch by comparing the voltage of said first power supply voltage which varies with said time constant with the voltage from said inverting means which varies with the interlocked operation of said second switch when said main power supply switch is turned off, and controls an electric device so as to be put in the operation status by turning on said stand-by switch according to the stored content in said storing when said main power supply switch is turned on again.

According to a third invention, a power supply circuit for an electric device having a main power supply switch comprises a main power supply switch for turning ON/OFF the electric power which is inputted from a commercial power source; a first power supply circuit which is provided in the subsequent stage of said main power supply switch and is able to output a first power supply voltage necessary for a main circuit part in an electric device according to the voltage from said commercial power source and also able to output a second power supply voltage required for a stand-by circuit in the electric device, and wherein said second power supply voltage falls with a predetermined time constant with turning off of the voltage supply from said commercial power source; controlling means which is included in said stand-by circuit, operated by said second power supply voltage, provided with a signal detection terminal and a control terminal for controlling said main circuit part, and able to control turning ON/OFF of said main circuit part using control signals from said control terminal; and a second switch which is connected between an output terminal of second power supply voltage of said first power supply circuit and said signal detection terminal of said controlling means, turned ON/OFF in the manner interlocking with turning ON/OFF of said main power supply switch, and supplies voltage which varies with turning ON/OFF of said main power supply switch to said signal detection terminal of the controlling means, wherein said controlling means is able to store the turning off of said main power supply switch in a storing means by comparing voltage of said first power supply voltage which varies with said time constant with voltage of said signal detection terminal which varies with the interlocked operation of said second switch when said main power supply switch is turned off, and controls an electric device so as to put it in the operation status by turning on said main circuit part according to the stored content in said storing means when said main power supply switch is turned on again.

In any of the first to third inventions, when the main power supply switch is turned off in the stand-by status or in the operation status, a second switch which is interlocked therewith is turned off. With this operation, a signal is transmitted to a controlling means such as a microcomputer, and the turning off of the main power supply switch is stored. When the main power supply switch is turned on next, all circuits in an electric device are put in the operation status without fail according to the stored contents. In this step, an interlocking switch which is configured with a main power supply switch and a second switch is manually turned ON/OFF, and the turning ON/OFF of the main power supply switch is stored in a nonvolatile storing means in a microcomputer. No electric power is consumed while the interlocking switch is turned off, and when the interlocking switch is turned on, a device is certainly put in the operation status. Besides, when a power failure occurs while an electric device is in the stand-by status or in the operation status and the power is restored from the power failure later, the device can be automatically set to the stand-by status without turning into the operation status. The same situation as that of a power failure occurs when an AC plug is pulled off a power supply outlet. When an AC plug is pulled off and then inserted into an outlet, an electric device is set to the stand-by status in the similar manner to that seen at the time when power is restored from a power failure.

According to a fourth invention, a power supply circuit for an electric device having a main power supply switch and a stand-by switch comprises a main power supply switch for turning ON/OFF of the electric power inputted from a commercial power source; a stand-by switch which is provided in the subsequent stage of said main power supply switch for turning ON/OFF the power supply to a main power supply circuit; a stand-by power supply circuit which is provided in the subsequent stage of said main power supply switch and is able to output a first power supply voltage required for a stand-by circuit in an electric device according to the voltage from said commercial power source, wherein said first power supply voltage falls with a predetermined time constant with turning off of the voltage supply from said commercial power source; controlling means which is included in said stand-by circuit and operated by said first power supply voltage, and has a signal detection terminal and a control terminal to control said stand-by switch, and is able to control turning ON/OFF of said stand-by switch according to control signals from said control terminal; and a second switch which is connected between an output terminal of said stand-by power supply circuit and said signal detection terminal of said controlling means, turned ON/OFF interlocking with said main power supply switch, and supplies voltage which varies with turning ON/OFF of said main power supply switch to said signal detection terminal of said controlling means, wherein said main power supply switch and said second switch are configured as an interlocking switch having a driving means, and wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls to put an electric device in the operation status by turning on said stand-by switch according to the stored content in said storing means when said main power supply switch is turned on again, while it is able to control turning ON/OFF of said stand-by switch according to the key operation of a remote operating means, and further able to turn off said main power supply switch and said second switch by giving drive voltage to the driving means of said interlocking switch according to the key operation of the remote operating means.

According to a fifth invention, a power supply circuit for an electric device according to the fourth invention comprises polarity inverting means for inverting the polarity of voltage which varies with the interlocked operation of said second switch and supplying it to said signal detection terminal of said controlling means when said main power supply switch is turned ON/OFF, wherein said controlling means is able to store the turning off of said main power supply switch into a storing means by comparing the voltage of said first power supply voltage which varies with said time constant with the voltage from said inverting means which varies with the interlocked operation of said second switch when said main power supply switch is turned off, and controls an electric device so as to be put in the operation status by turning on said stand-by switch according to the stored content in said storing means when said main power supply switch is turned on again.

According to a sixth invention, a power supply circuit for an electric device having a main power supply switch comprises a main power supply switch for turning ON/OFF the electric power inputted from a commercial power source; a first power supply circuit which is provided in the subsequent stage of said main power supply switch, is able to output a first power supply voltage required for the main circuit part in an electric device according to the voltage from said commercial power source, and also able to output a second power supply voltage required for a stand-by circuit in the electric device, wherein said second power supply voltage falls with a predetermined time constant with turning off of the voltage supply from said commercial power source; controlling means which is included in said stand-by circuit and operated by said second power supply voltage, has a signal detection terminal and a control terminal for controlling said main circuit part, and is able to control turning ON/OFF of said main circuit part according to control signals from said control terminal; and a second switch which is connected between an output terminal of second power supply voltage of said first power supply circuit and said signal detection terminal of said controlling means, is turned ON/OFF interlocking with said main power supply switch, and supplies voltage which varies with turning ON/OFF of said main power supply switch to said signal detection terminal of said controlling means, wherein said main power supply switch and said second switch are configured as an interlocking switch having a driving means, and wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls to put an electric device in the operation status by turning on said main circuit part according to the stored content in said storing means when said main power supply switch is turned on again, while it is able to control turning ON/OFF of said main circuit part according to the key operation of a remote operating means, and further able to turn off said main power supply switch and said second switch by giving drive voltage to a driving means of said interlocking switch according to the key operation of a remote operating means.

In any of the fourth to sixth inventions, since both the main power supply switch and the second switch are configured with interlocking switches having a driving means such as a solenoid, it becomes possible to turn off the main power supply switch and the second switch by giving the drive voltage to the driving means (solenoid) of the interlocking switch according to the operation of a remote operating means. Not only the same operation effects as those attained in the first to third inventions are available but also operational efficiency is improved when an electric device is all turned off (power supply is completely turned off).

BRIEF DESCRIPTION OF THE DRAWINGS

FIG. 1 is a block diagram showing a power supply circuit for an electric device according to a first embodiment of the present invention;

FIGS. 2(a) and (b) are timing charts showing a relation between Vcc and Vsw in order to to operation of FIG. 1;

FIGS. 3(a) are (b) timing charts showing a relation between Vcc and Vsw in order to illustrate the operation of FIG. 1;

FIGS. 5(a) and (b) are timing charts showing a relation between Vcc and Vsw in order to illustrate the operation of FIG. 4;

DETAILED DESCRIPTION OF THE PREFERRED EMBODIMENTS

The present invention will now be described in detail hereinafter with reference to the accompanying drawings which illustrate preferred embodiments thereof.

Figure 11:
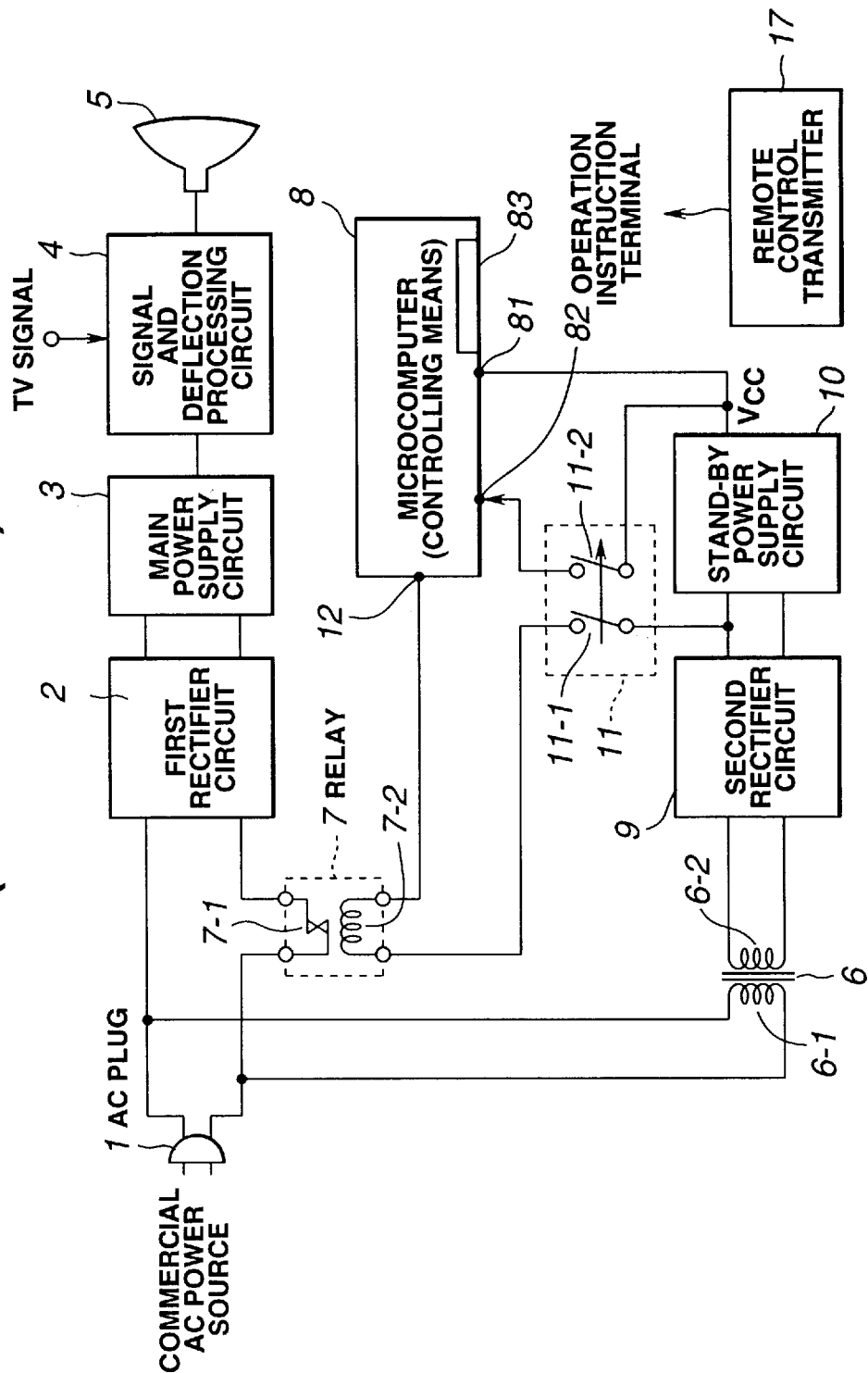
FIG. 11 is a block diagram showing a power supply circuit for a conventional electric device.
Figure 12:
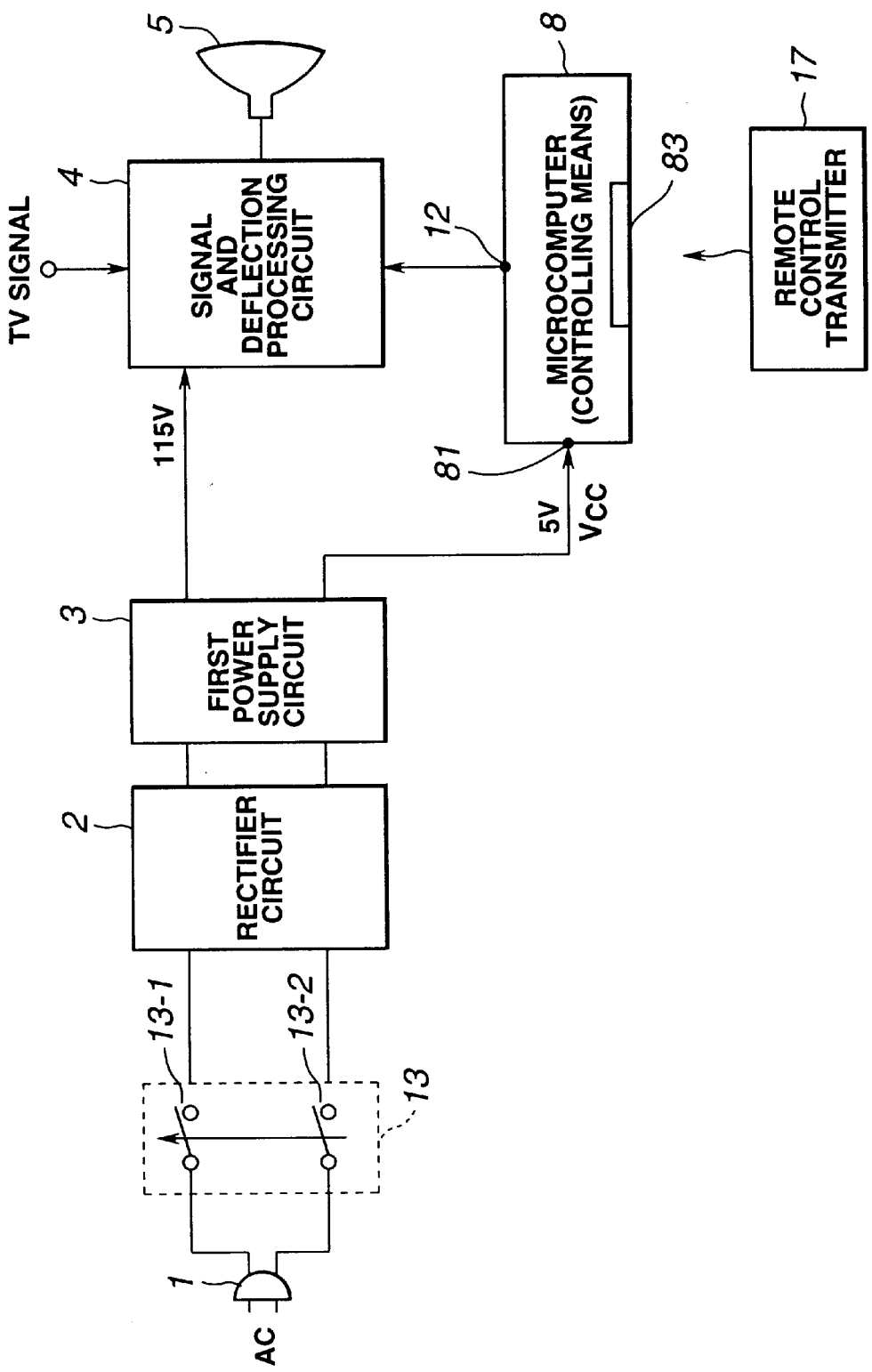
FIG. 12 is a block diagram showing a power supply circuit for another conventional electric device.

FIG. 1 shows a power supply circuit for an electric device according to a first embodiment of the present invention. In this embodiment and other embodiments to follow, descriptions will be given on a power supply circuit for a television set as an example. The same reference numeral is given to the same part in FIG. 11.

In FIG. 1, an AC plug 1 is connected with the commercial alternating current power source (AC). One line of the AC plug 1 is connected with one input terminal of a first rectifier circuit 2, and the other line is connected with the other input terminal of the first rectifier circuit 2 via an AC switch 14-1 of an interlocking switch 14 and a switch 7-1 of a relay 7. Rectified voltage which is obtained by rectifying and smoothing commercial AC voltage is outputted from the first rectifier circuit 2. The rectified voltage is turned into stabilized DC voltage at a main power supply circuit 3, which is configured with a stabilized power supply circuit such as switching type power supply circuit, and supplied to a signal and deflection processing circuit 4 of a TV set. Video signals and deflection signals from the signal and deflection processing circuit 4 are supplied to a picture tube (CRT) 5. The AC switch 14-1 functions as the main power supply switch and the relay 7 functions as the stand-by switch.

The interlocking switch 14 is a manual switch having an AC switch 14-1 as the main power supply switch and a second switch 14-2, which is turned ON/OFF interlocking with turning ON/OFF of this AC switch 14-1.

Meanwhile, the commercial AC power is supplied to a primary winding 6-1 of a stand-by transformer 6 via the AC switch 14-1, and the output of a secondary winding 6-2 thereof is supplied to a second rectifier circuit 9. The rectified output is supplied to a stand-by power supply circuit 10 configured with a stabilized power supply circuit such as a switching type power supply circuit. In an output side of the stand-by power supply circuit 10, a smoothing capacitor C1 in which DC voltage is charged is included. The stabilized output voltage Vcc of the stand-by power supply circuit 10 is supplied to a power supply input terminal 81 of the microcomputer 8A which is a controlling means. The second rectifier circuit 9 outputs rectified voltage which is obtained by rectifying and smoothing AC voltage obtained from the commercial AC power source. The stand-by power supply circuit 10 stabilizes the rectified voltage and also converts it into power supply voltage for microcomputer before outputting it.

An output terminal of the second rectifier circuit 9 is connected with one end of the winding 7-2 of the relay 7, and the other end thereof is connected with the ON/OFF terminal 12 of the microcomputer 8A.

Further, it is designed so that the output voltage Vcc of the stand-by power supply circuit 10 is supplied to an AC switch-off detection terminal 15 of the microcomputer 8A, that is, to a main power supply switch-off detection terminal via a second switch 14-2 of the interlocking switch 14.

The microcomputer 8A which is a controlling means is provided with a power supply terminal 81 where the power supply voltage Vcc is supplied from the stand-by power supply circuit 10, and also with the ON/OFF terminal 12 for turning ON/OFF the relay 7, the stand-by switch, for putting a TV set in the operation status or the stand-by status. It is further provided with an AC switch-off detection terminal 15 for detecting an AC switch-off detection signal which is obtained by turning off of the second switch 14-2 when the AC switch 14-1 is turned off while a TV set is in the stand-by status or the operation status. The microcomputer 8A is provided with a means for comparing voltage Vcc which is supplied to the power supply terminal 81 with voltage Vsw which is supplied to the AC switch-off detection terminal 15,
and a storing means (not shown) for storing the compared result (when Vsw<Vcc, low level; when Vsw=Vcc, high level). This storing means is formed with a nonvolatile memory so that said compared result (detected results such as turning off of the AC switch 14-1) is able to be stored and held even when power supply voltage Vcc of the microcomputer 8A is on a zero level, that is, when a TV set is in the all-off status.

Now, a description will be given on the operation of a first embodiment shown in FIG. 1.

When the AC switch 14-1 which is a main power supply switch is turned on by operating the interlocking switch 14, the second switch 14-2 which has homopolarity with and is interlocked with the switch 14-1 is turned on simultaneously. With this operation, AC voltage is supplied from the commercial AC power source to a second rectifier circuit 9 via a stand-by transformer 6, rectified and smoothed. The power supply voltage Vcc for microcomputer is supplied to the power supply terminal 81 of the microcomputer 8A which is a load circuit requiring the stand-by operation from the stand-by power supply circuit 10. At the same time, power supply voltage Vcc is also supplied to the AC switch-off detection terminal 15 via the second switch 14-2. Under this condition, the microcomputer 8A does not store signal level Vsw of the AC switch-off detection terminal 15 in the storing means. In the storing means, signal level Vsw which was detected at the time when the AC switch was turned off before has been stored.

The microcomputer 8A controls the ON/OFF terminal 12 referring to the stored contents which is stored in a storing means at the time of the throwing in after the interlocking switch 14, that is, the AC switch 14-1 is thrown in (ON). If the stored content at the time of throwing in of power supply is on a low level, the ON/OFF terminal 12 is decided to be in the operation status (ON), and if the stored content is on a high level, the ON/OFF terminal 12 is decided to be in the stand-by status (OFF). Being in the operation status (ON) means here that the terminal 12 is connected with a reference potential point (ground) of the body of a device. With this operation, drive electric current flows from one output line of the second rectifier circuit 9 to the ON/OFF terminal 12 via the winding 7-2 of the relay 7, turning on the switch 7-1 of the relay 7. In other words, the stand-by switch 7 is turned on, power supply is thrown in to circuits 3, 4 and 5 to follow the first rectifier circuit 2, putting a TV set in the operation status. When the terminal 12 is in the stand-by status (OFF), the stand-by switch 7 is turned off, putting a TV set if the stand-by status.

FIGS. 2(*a*) and (*b*) are timing charts showing power supply voltage Vcc which is supplied from a stand-by power supply circuit 10 to a microcomputer 8A, and signal Vsw which is added to the microcomputer 8A via a second switch 14-2 when a switch 14 is turned on and off. When the switch 14 is turned off from the ON status, the second switch 14-2 is turned off simultaneously with turning off of the AC switch 14-1. With turning off of the second switch 14-2, though signal Vsw becomes low level, power supply voltage Vcc retains voltage required as the power source for a given period (shown by hatching in the figure) because charge remains in a smoothing capacitor C1 which is included in the stand-by power supply circuit 10, even after the switch 14 is turned off as shown in FIG. 2(*a*). Power supply voltage Vcc falls slowly with a certain time constant due to the capacitor C1 which is included in the stand-by power supply circuit 10. While signal Vsw is on a low level and power supply voltage Vcc retains voltage required for the microcomputer operation as shown in FIG. 2(*b*), the microcomputer 8A compares signal level Vsw of a detection terminal 15 with voltage level Vcc of a power supply terminal 81, and when Vsw<Vcc, stores that the switch 14 is turned off (that is, signal Vsw fell to become low level) in a nonvolatile storing means in the microcomputer 8A. With this operation, the microcomputer 8A, when the switch 14 is pressed next and power supply voltage Vcc rises (a microcomputer detects the rising of Vcc through the rising of Vsw), puts the ON/OFF terminal 12 into the operation status (ON) according to the stored content (Vsw is on a low level) in said storing means, and turns on the switch 7-1 of the relay 7, the stand-by switch, putting a TV set into the operation status without fail.

In other words, when the AC switch 14-1 which is the main power supply switch is turned off while a TV set is in the stand-by status, with turning off of the second switch 14-2, signal Vsw is transmitted to the microcomputer 8A so as to make the turning off of the AC switch 14-1 stored and the TV set turn into the operation status for certain when the AC switch 14-1 is turned on next.

Similarly, a TV set can also certainly turn into the operation status referring to the stored content when the AC switch 14-1 is turned off while the TV set is in the operation status and the AC switch 14-1 is turned on next.

In the manner described above, a TV set can be put into the operation status without fail when the main power supply switch is turned off either in the TV set's stand-by status or operation status, and then, turned on again. Consequently, when the main power supply switch is turned on again after the main power supply switch is turned off, it is unnecessary further to operate a remote control transmitter so as to put a TV set into the operation status. That is, the operation status is available with only one manual operation of the main power supply switch, requiring no remote control transmitter operation. In addition, since the power supply from the commercial power source is thoroughly cut off by turning off the main power supply switch, electric power is not consumed.

Further, the circuit shown in FIG. 1 is designed so that a TV set surely turns into the stand-by status when a power failure occurs while the TV set is either in the operation status or in the stand-by status and the power is restored from the power failure later.

Now, a description will be given on a case where a power failure occurs with reference to FIGS. 3(a) and (b). In FIG. 1, when a power failure occurs in the stand-by status (when the switch 14 is ON and the relay 7 is OFF), although the switches 14-1 and 14-2 remain in the ON status, power supply voltage Vcc toward the microcomputer 8A falls as shown in FIG. 3(a) due to a gradual decline in charge of the capacitor C1 caused by the power failure. At this time, voltage Vsw, which is supplied to the terminal 15 of the microcomputer 8A via the switch 14-2, shows the same change as shown in FIG. 3(b) as that in voltage Vcc shown in FIG. 3(a). Accordingly, when the microcomputer 8A compares Vsw with Vcc, as Vsw=Vcc, it cannot detect that voltage Vsw declined compared with voltage Vcc (that Vsw became low level), the microcomputer 8A stores Vsw=high level in the storing means therein. Consequently, when the power is restored from the power failure (restoration from a power failure is detected by the microcomputer 8A by rising of Vsw), since the microcomputer 8A turns the ON/OFF terminal 12 into the stand-by status (OFF) according to the stored content, it does not cause the switch 7-1 of the relay 7 to perform the ON operation, and a TV set turns into the stand-by status after the restoration from a power failure.

This is because, as described above, the microcomputer 8A is designed to be able to turn on the relay 7 only when the switch 14 is turned on (conducted) in a stored status where Vsw is on a low level (turning on of this switch 14 is detected by rising of Vsw).

The operation shown in FIGS. 3(a) and (b) indicates that there is no danger for an electric device such as a TV set to be left in the operation status for hours with nobody around when a power failure occurs while the TV set is in the stand-by status, particularly while the user is absent, and the power is restored from the power failure.

The timing charts shown in FIGS. 3(a) and (b) are also applicable to a case where the AC plug 1 is pulled out while a TV set is in the operation status or in the stand-by status (when the switch 14 is turned on) and connected again with the commercial AC power source.

Figure 4:
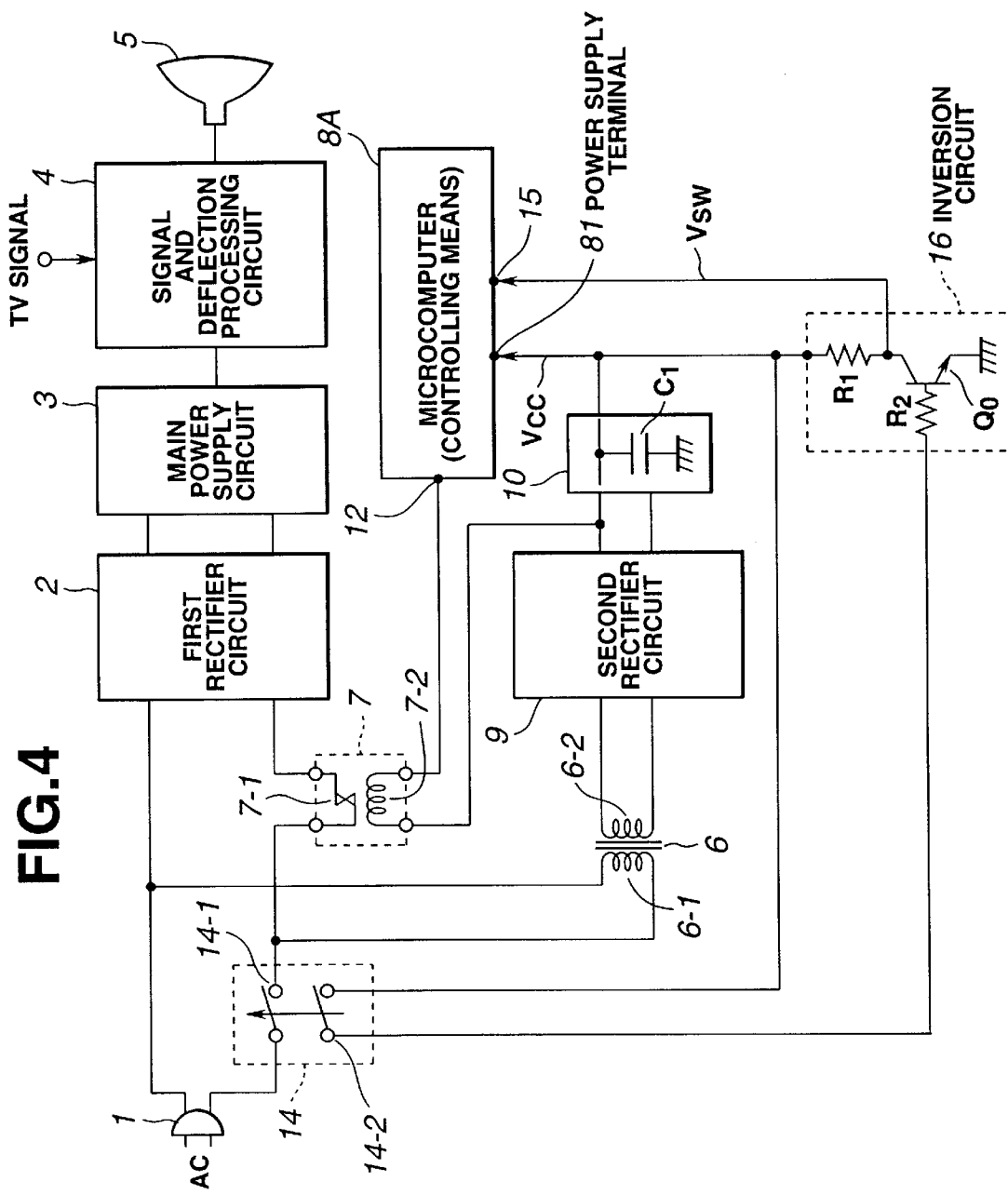
FIG. 4 is a block diagram showing a power supply circuit for an electric device according to second embodiment of the present invention.

FIG. 4 is a block diagram showing a power supply circuit for an electric device according to a second embodiment of the present invention. FIG. 4 shows an embodiment when polarity of signal Vsw to the microcomputer 8A shown in FIG. 1 is inverted. With this, the operation polarity of the ON/OFF terminal 12 of the microcomputer 8A is also inverted. The circuit configuration is almost the same as that in FIG. 1 except one point that an output terminal of the stand-by power supply circuit 10, the power supply circuit for microcomputer, is connected with the AC switch-off detection terminal 15 of the microcomputer 8A via the second switch 14-2 in the switch 14 and an inversion circuit 16 as a polarity inverting means. Said inversion circuit 16 is configured so that it connects output terminals of the stand-by power supply circuit 10 with a reference potential point via a resistor R1 and collector-emitter route of a transistor Q0 in series, and also connects output terminals of the stand-by power supply circuit 10 with the base of the transistor Q0 via the second switch 14-2 of the switch 14 and a resistor R2. Thus, collector output of the transistor Q0 is supplied to the AC switch-off detection terminal 15 as signal Vsw. Through the operation for comparing voltage Vcc of the power supply terminal 81 with voltage Vsw of the AC switch-off detection terminal 15 performed in the microcomputer 8A, in the similar manner to that shown in FIG. 1, a low level is stored when Vsw<Vcc, and a high level is stored when Vsw=Vcc in a nonvolatile storing means (not shown). On the ON/OFF terminal 12, however, the operation polarity becomes contrary to the case in FIG. 1, and the ON/OFF terminal 12 (i.e. a TV set) turns into the stand-by status (OFF) when the stored content is on a low level and turns into the operation status (ON) when the stored content is on a high level. Other configuration is the same as that in FIG. 1.

FIGS. 5(a) and (b) are timing charts of power supply voltage Vcc of the microcomputer 8A and signal Vsw which is added to the AC switch-off detection terminal 15 of the microcomputer 8A via the switch 14-2 and the inversion circuit 16, when the switch 14 is turned on and off. FIG. 5(a) shows the change in voltage Vcc and FIG. 5(b) shows the change in voltage Vsw. When the switch 14 is turned off, and while signal Vsw becomes high level and power supply voltage Vcc retains voltage, the microcomputer 8A stores that the switch 14 is turned off (Vsw is on a high level). When the switch 14 is pressed again after being turned off, the microcomputer 8A turns on the relay 7 according to said stored content (Vsw is on a high level) so as to put a TV set into the operation status without fail.

When a power failure occurs while a TV set is in the stand-by status (while the relay 7 is turned off), since a low level is detected and stored at the terminal 15 at the time of the power failure, when the power is restored from the power failure later, the ON/OFF terminal 12 is put into the stand-by status according to the stored content showing a low level, ensuring safety and economy during the user's absence.

In this embodiment, too, electric power is not consumed because the commercial power source is completely cut off by turning off the main power supply switch 14-1 by the switch 14.

Figure 6:
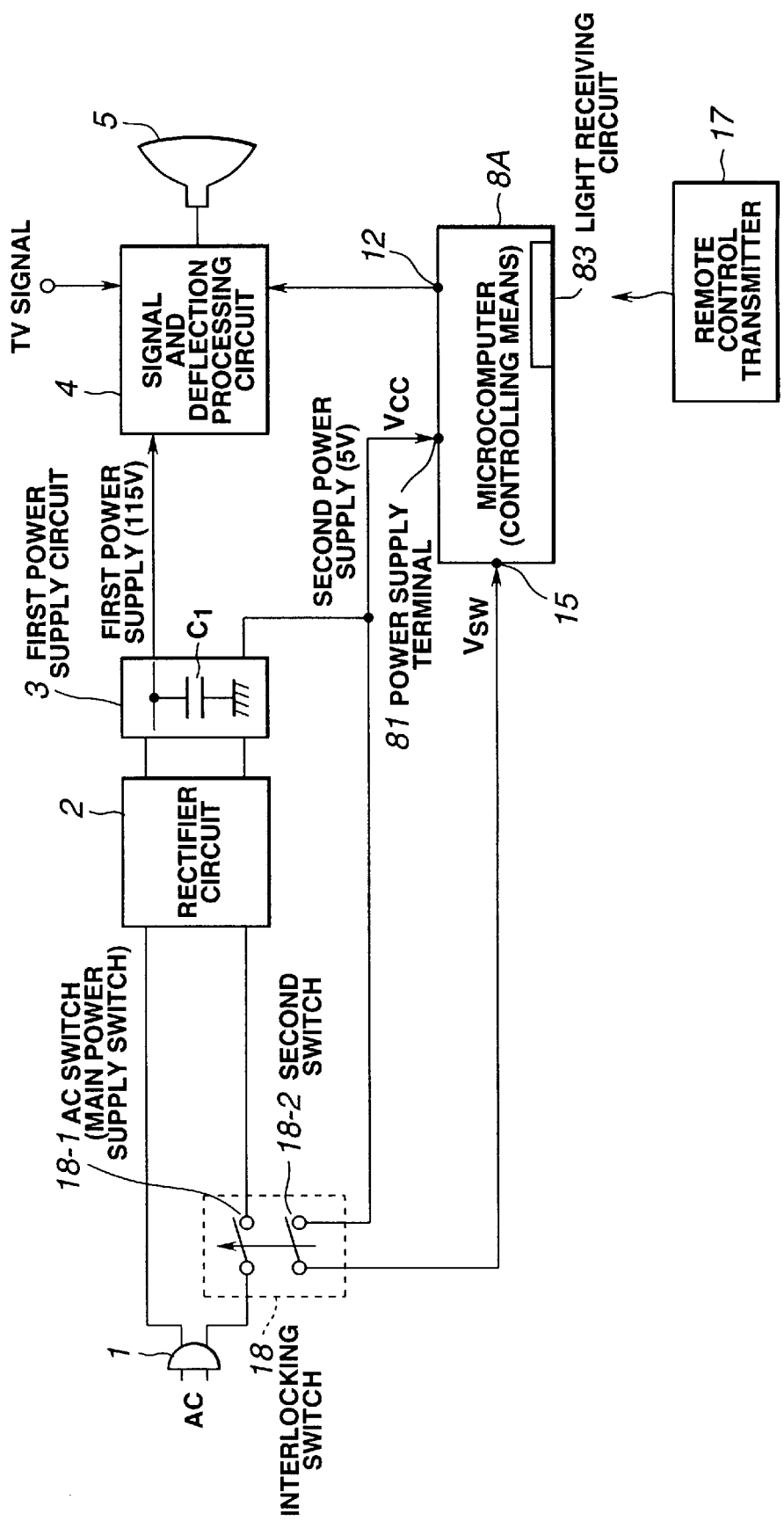
FIG. 6 is a block diagram showing a power supply circuit for an electric device according to a third embodiment of the present invention.

FIG. 6 is a block diagram showing a power supply circuit for an electric device according to a third embodiment of the present invention. The AC plug 1 is connected with the commercial alternating current power source (AC). One line of the AC plug 1 is connected with one input terminal of the rectifier circuit 2, and the other line thereof is connected with the other input terminal of the rectifier circuit 2 via an AC switch 18-1, the main power supply switch in an interlocking switch 18. The rectified output is supplied to the first power supply circuit 3 which is configured with a stabilized power supply circuit. From the first power supply circuit 3, various sizes of power supply voltage is generated. An output side in the first power supply circuit 3 comprises a smoothing capacitor C1 which is charged with DC voltage. The stabilized first power supply voltage (e.g. 115 V) from the first power supply circuit 3 is supplied to the signal and deflection processing circuit 4 of a TV set. Video signals and deflection signals from the signal and deflection processing circuit 4 are supplied to the picture tube (CRT) 5. While another stabilized second power supply voltage (e.g. 5 V) from the first power supply circuit 3 is supplied to the power supply terminal 81 of the microcomputer 8A as power supply voltage for microcomputer, it is also supplied to the AC switch-off detection terminal 15 of the microcomputer 8A via a second switch 18-2 in the interlocking switch 18. Since the light receiving circuit 83 is provided in the microcomputer 8A, the microcomputer 8A can receive and decode signals such as infrared rays from the remote control transmitter 17. It is designed so that, according to the operation instruction (ON) or operation stoppage (OFF) signal from the remote control transmitter 17, a signal for ON or OFF is outputted from the ON/OFF terminal 12 of the microcomputer 8A and inputted to a control terminal of the signal and deflection processing circuit 4.

In the above configuration according to a third embodiment, too, at the time when the switch 18 is turned on and off, the timing relation of voltage Vcc, which is supplied to the power supply terminal 81 of the microcomputer 8A, to voltage Vsw, which is supplied to the AC switch-off detection terminal 15, becomes similar to that shown in FIGS. 2(a) and (b). Accordingly, by turning on the switch 18, a TV set is put into the stand-by status (a state where power supply voltage Vcc is supplied to the microcomputer 8A and an ON signal is not supplied from the terminal 12 to a control terminal of the signal and deflection processing circuit 4). When the switch 18 is turned off, while the charge of the capacitor C1 of the first power supply circuit 3 remains, the microcomputer 8A compares Vcc with Vsw, and when Vsw<Vcc, stores that Vsw is on a low level in the nonvolatile storing means in the microcomputer 8A. When the switch 18 is turned on later again (this turning on is detected at the microcomputer 8A by rising of Vsw), the microcomputer 8A outputs an ON signal from the ON/OFF terminal 12 according to the stored content (Vsw is on a low level) and puts the signal and deflection processing circuit 4 into the operation status.

In this third embodiment, too, when a power failure occurs while the switch 18 is in the turned-on status and then the power is restored from the power failure, the relation between Vcc and Vsw becomes similar to that shown in FIGS. 3(a) and (b). When the power is restored from a power failure, the microcomputer 8A turns the terminal 12 into the OFF status according to the content, that Vsw is on a high level, stored in the microcomputer 8A at the time of the power failure, and turns the circuit 4 of a TV set into the stand-by status. With this operation, safety and economy of the TV set is ensured even when a power failure and restoration from it occurs during the user's absence.

According to a first to third embodiments described above, operationally speaking, since the interlocking switch, including the main power switch, also plays the role of the stand-by switch virtually, when it is switched off from the switched-on status, then, switched on again, a TV set immediately turns into the operation status, and at the same time, realizes zero consumption of electric power by turning off the main power supply switch. It is an advantage that, when a power failure occurs in the switched-on status and the power is restored later, a TV set is automatically set to the stand-by status.

The same status as that caused by a power failure occurs when an AC plug is pulled off from a commercial power supply outlet. When an AC plug is pulled off from, then inserted again into a commercial power supply outlet, an electric device is set to the stand-by status in a similar manner to the case where the power is restored from a power failure.

Now, a description will be given on the configuration, which enables to turn off the interlocking switch 14 or 18 by operating a remote control transmitter, on each of a first to a third embodiments stated above.

Figure 7:
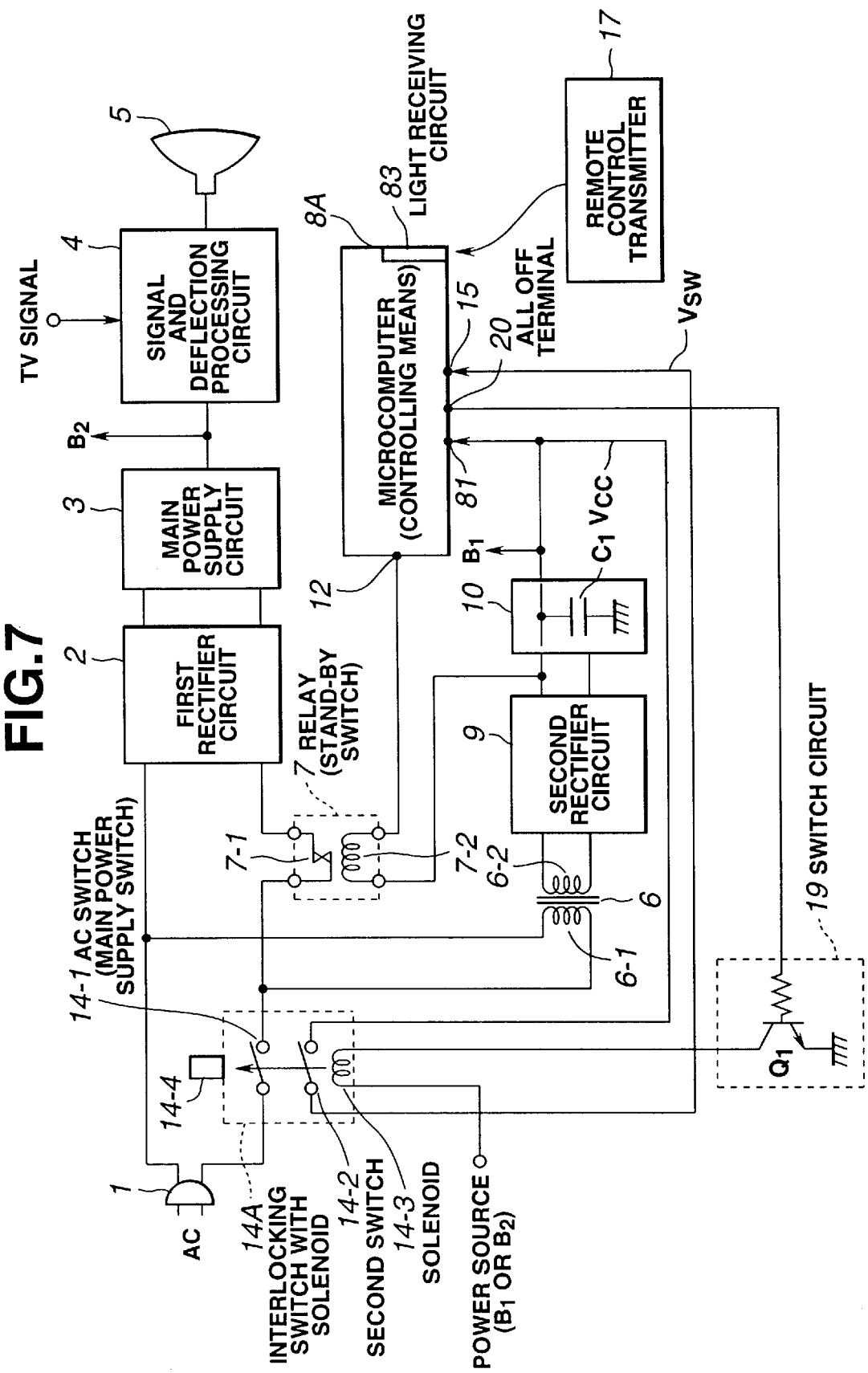
FIG. 7 is a block diagram showing a power supply circuit for an electric device according to a fourth embodiment of the present invention.
Figure 8:
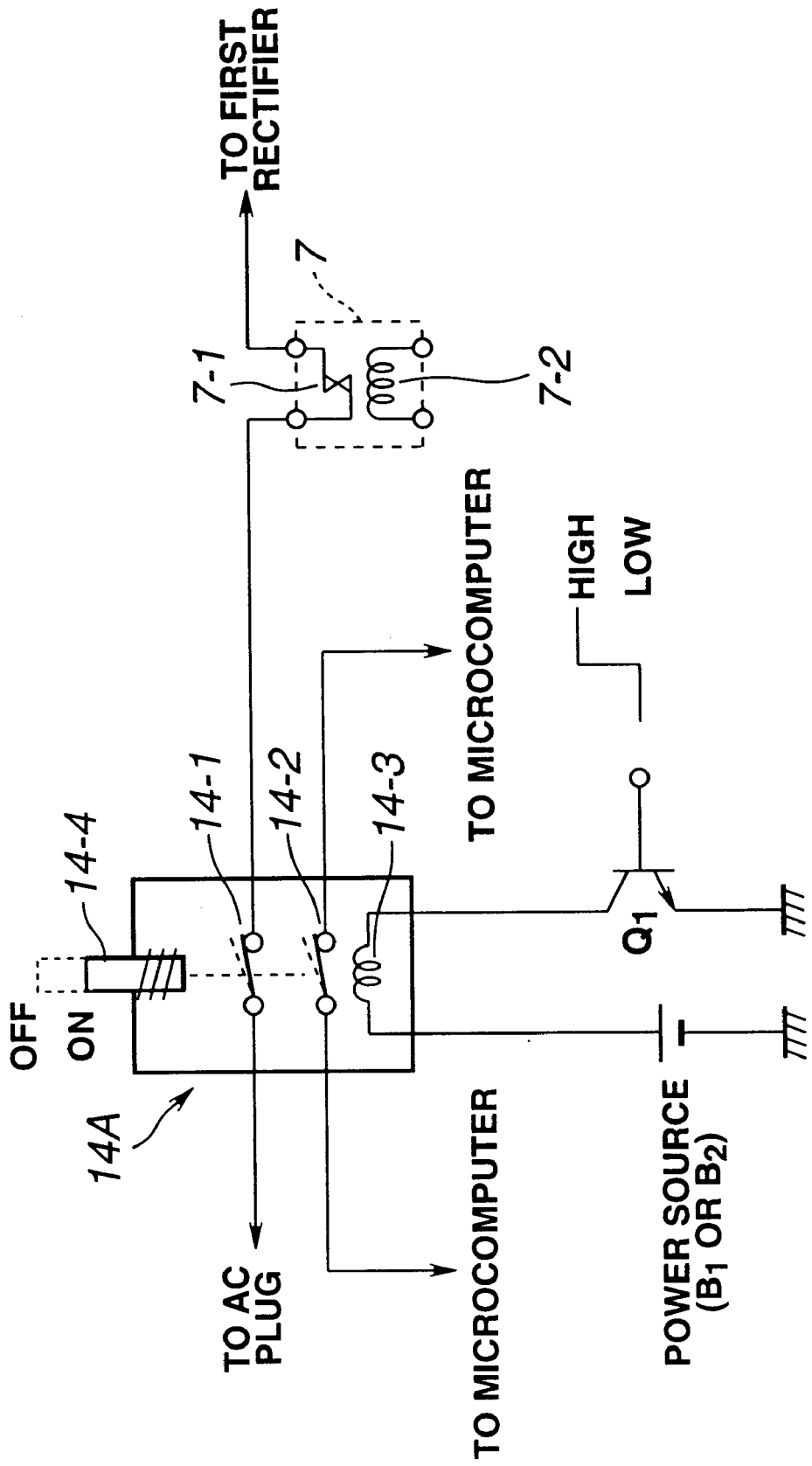
FIG. 8 is a diagram showing an example of configuration of an interlocking switch with solenoid as shown in FIG. 7.

FIG. 7 is a block diagram showing a power supply circuit for an electric device according to a fourth embodiment of the present invention. This embodiment is configured so that the interlocking switch in a first embodiment shown in FIG. 1 is turned off using the remote control transmitter 17. The same parts as those in FIG. 1 are given the same reference numerals. FIG. 8 shows an example of configuration of an interlocking switch with solenoid shown in FIG. 7.

In FIG. 7, points different from FIG. 1 are: the interlocking switch 14 in FIG. 1 is replaced by an interlocking switch with solenoid 14A; turning off of the interlocking switch 14A became possible by supplying drive electric current to the solenoid winding 14-3 using a switch circuit 19 for drive according to control signals from the microcomputer 8A, that is, all-off (stoppage) of a device using the microcomputer 8A became possible; and a remote control signal for all-off became transmissible from the remote control transmitter 17 to the light receiving circuit 83, which is provided in the microcomputer 8A, by operating the all-off key provided on the remote control transmitter 17.

The AC plug 1 is connected with the commercial alternating current power source (AC). One line of the AC plug 1 is connected with one input terminal of the first rectifier circuit 2, and the other line is connected with the other input terminal of the first rectifier circuit 2 via the AC switch 14-1 of the interlocking switch with solenoid (electromagnet) 14A and the switch 7-1 of the relay 7. From the first rectifier circuit 2, rectified voltage, which is rectified and smoothed commercial AC voltage, is outputted. The rectified voltage is turned into the stabilized DC voltage at the main power supply circuit 3, which is configured with stabilized power supply circuits such as a switching type power supply circuit, and supplied to the signal and deflection processing circuit 4, the main circuit of a TV set. Video signals and deflection signals from the signal and deflection processing circuit 4 are supplied to the picture tube (CRT) 5.

Meanwhile, commercial AC power is supplied to the primary winding 6-1 of the stand-by transformer 6 via the AC switch 14-1, and output of the secondary winding 6-2 thereof is supplied to the second rectifier circuit 9. The rectified output voltage is supplied to the stand-by power supply circuit 10. An output side of the stand-by power supply circuit 10 comprises the smoothing capacitor C1. Output voltage Vcc of the stand-by power supply circuit 10 is supplied to the power supply terminal 81 of the microcomputer 8A, the controlling means. The second rectifier circuit 9 outputs rectified voltage, which is obtained by rectifying and smoothing AC voltage obtained from the commercial AC power source, and the stand-by power supply circuit 10 stabilizes the rectified voltage and also converts it into power supply voltage for microcomputer before outputting it.

An output terminal of said second rectifier circuit 9 is connected with one end of the winding 7-2 of the relay 7, and the other end of the winding 7-2 is connected with the ON/OFF terminal 12 of the microcomputer 8A. Provided in the microcomputer 8A is the light receiving circuit 83 which enables remote control signals such as infrared rays from the remote control transmitter 17, the remote operating means, to be received.

It is further configured so that output voltage Vcc of the stand-by power supply circuit 10 is supplied to the AC switch-off detection terminal 15 of the microcomputer 8A via the second switch 14-2 of the interlocking switch with solenoid 14A.

One end of the winding 14-3 in the interlocking switch with solenoid 14A is connected with the output of power supply [output of said second rectifier circuit 9, output B1 of said stand-by power supply circuit 10, output B2 of said main power supply circuit 3, or power supply (not shown) in the signal and deflection processing circuit 4], and the other end of the winding 14-3 is connected with a reference potential point via the switch circuit 19 so that the switch circuit 19 can be turned ON/OFF by a signal from an all-off terminal 20 of the microcomputer 8A.

Provided in the microcomputer 8A, the controlling means, are: besides the power supply terminal 81 where power supply voltage Vcc is supplied from the stand-by power supply circuit 10; the ON/OFF terminal 12 for turning ON/OFF the relay 7, the stand-by switch, in order to put a TV set into the operation status or the stand-by status; the AC switch-off detection circuit 15 for detecting an AC switch-off detection signal which is generated by turning off of the second switch 14-2 when the AC switch 14-1 is turned off while a TV set is in the stand-by status or the operation status; and the all-off terminal 20 which outputs an all-off signal for turning off the main power supply switch 14-1 of a TV set according to the operation of the all-off key provided on the remote control transmitter 17. The microcomputer 8A is provided with a means for comparing voltage Vcc to be supplied to the power supply terminal 81 with voltage Vsw to be supplied to the AC switch-off detection terminal 15, and a storing means (not shown) for storing the compared result (that low level when Vsw<Vcc, high level when Vsw=Vcc). This storing means is formed with a nonvolatile memory so that said compared result (detected results such as turning off of the AC switch 14-1) can be stored and held even when power supply voltage Vcc of the microcomputer 8A becomes zero level, that is, when a TV set is turned into the all-off status.

The microcomputer 8A, the controlling means is supplied with power supply voltage from the stand-by power supply circuit 10. The microcomputer 8A is able to control turning ON/OFF of the relay 7, the stand-by switch, according to the power key operation on the remote control transmitter 17, and also able to control so as to turn off the AC switch 14-1 and the second switch 14-2 by giving drive electric current to the coil 14-3 of the interlocking switch with solenoid 14A through turning on the switch circuit 19 by operating said all-off key provided on the remote control transmitter 17.

In this embodiment, on the remote control transmitter 17, the remote operating means, an all-off key is provided for turning off the interlocking switch with solenoid 14A with remote control transmitter operation in addition to various keys necessary for audio visual operation of a TV set (including a power key).

As described above, in this embodiment, the interlocking switch with solenoid 14A as shown in FIG. 8 is adopted for turning off the main power supply switch 14-1 using the remote control transmitter 17.

The interlocking switch with solenoid 14A, as shown in FIG. 8, has the AC switch 14-1, the second switch 14-2, the coil 14-3 and a manual actuation part 14-4. By pressing the manual actuation part 14-4, the switches 14-1 and 14-2 can be turned ON/OFF in an interlocked manner, and by flowing drive electric current to the coil 14-3 while the switches 14-1 and 14-2 are in the ON status (shown with solid lines in the figure), the switches 14-1 and 14-2 can be turned into the OFF status (shown with dotted lines in the figure) in the interlocked manner. The coil 14-3 forms a part of solenoid (electromagnet) and, using its electromagnetic force, operates the switches 14-1 and 14-2 so as to be turned off. With the switches 14-1 and 14-2 being turned off, the manual actuation part 14-4 returns to the OFF position.

The manual actuation part 14-4 is, for example, push-push type. Pushing it once switches it on and pushing it again switches it off. In order to turn the switches 14-1 and 14-2 into the ON status while they are in the OFF status, the user pushes the manual actuation part 14-4 manually to turn them on. There are some switches with solenoid which have already been on the market (e.g. products of Airs Electric Co.).

One end of the coil 14-3 is connected with a power supply output (e.g. B1 or B2), and the other end is connected with a reference potential point via a collector-emitter route of a transistor Q1 for switch. By supplying voltage for all-off on a high level from the microcomputer 8A to the base of this transistor Q1, the transistor Q1 is turned on, letting coil electric current flow from the power source to the reference potential point side via the coil 14-3 and the transistor Q1 so as to turn off the switches 14-1 and 14-2 in the interlocked manner using electromagnetic force of the coil 14-3.

In order to put the main power supply circuit 14-1 and the second switch 14-2 into the ON status again from the OFF status using the remote control transmitter 17, all that need to be done is to press the manual actuation part 14-4 of said interlocking switch with solenoid 14A.

Now, a description will be given on the operation of this embodiment shown in FIG. 7.

When the main power supply switch 14-1 and the second switch 14-2 are turned on by pressing the manual actuation part 14-4 of the interlocking switch with solenoid 14A, AC voltage is supplied from the commercial AC power source to the second rectifier circuit 9 via the stand-by transformer 6, then, rectified and smoothed. In addition, power supply voltage Vcc for microcomputer is supplied from the stand-by power supply circuit 10, the power source for microcomputer, to the power supply input terminal 81 of the microcomputer 8A which is a load circuit requiring the stand-by operation. At this time, the switch 7-1 of the relay 7, the stand-by switch, has been turned off, and power supply has not been thrown in yet to the circuits 3, 4 and 5 which follow the first rectifier circuit 2, being in the stand-by status.

When the power key on the remote control transmitter 17 is pressed later, an infrared code signal, which shows that power supply is turned on, is inputted to the light receiving circuit 83, and the microcomputer 8A decodes the code signal and turns the ON/OFF terminal 12 from the stand-by status (OFF) into the operation status (ON). The operation status (ON) means here that the terminal 12 is connected with a reference potential point (ground) of the body of a device. With this operation, drive electric current flows from one output line of the second rectifier circuit 9 to the ON/OFF terminal 12 via the drive winding 7-2 of the relay 7, turning on the switch 7-1 thereof. In other words, the stand-by switch 7 is turned on, and power supply is thrown in to the circuits 3, 4 and 5 which follow the first rectifier circuit 2, putting a TV set into the operation status.

A TV set can be put into either the stand-by status or the operation status in the above manner. In either of the stand-by status or the operation status, when the all-off key on the remote control transmitter 17 is pressed, an infrared code signal corresponding to the key is inputted to the light receiving circuit 83, and the microcomputer 8A decodes this signal and outputs signal voltage on a high level to the all-off terminal 20 for turning off the interlocking switch with solenoid 14A. This signal voltage is inputted to the base of the switch circuit 19, conducting (ON) between the collector and the emitter of the transistor Q1. Then, drive electric current flows to the coil 14-3 of the interlocking switch with solenoid 14A, causing the switches 14-1 and 14-2 to perform the OFF operation. At this time, the manual actuation part 14-4 also returns to the OFF position.

When the interlocking switch 14A is turned off from the ON status, the second switch 14-2 is turned off at the same time as the turning off of the AC switch 14-1. Though signal Vsw becomes low level by turning off of the second switch 14-2, power supply voltage Vcc retains necessary voltage for a power source for a given period (shown with hatching in FIG. 2(*a*)), because the charge in the smoothing capacitor C1 included in the stand-by power supply circuit 10 remains as shown in FIG. 2(*a*) even after the switch 14A is turned off. Power supply voltage Vcc slowly falls with a time constant due to the capacitor C1 included in the power supply circuit 10. While signal Vsw becomes low level and power supply voltage Vcc retains voltage as shown in FIGS. 2(*b*) and (*a*), the microcomputer 8A compares signal level Vsw of the detection terminal 15 with voltage level Vcc of the power supply terminal 81, and when Vsw<Vcc, stores that the switch 14A is turned off (that is, signal Vsw fell to become low level) in the nonvolatile storing means in the microcomputer 8A. With this operation, the microcomputer 8A, when the switch 14A is pressed next and power supply voltage Vcc rises, refers to the stored content (Vsw is on a low level) in said storing means, and according to it, puts said ON/OFF terminal 12 into the operation status (ON), and turns on the switch 7-1 of the relay 7, the stand-by switch, so as to put a TV set into the operation status without fail.

In other words, when the AC switch 14-1 which is a main power supply switch is turned off while a TV set is in the stand-by status, with the second switch 14-2 being turned off, signal Vsw is transmitted to the terminal 15 of the microcomputer 8A, and the turning off of the AC switch 14-1 is stored. When the AC switch 14-1 is turned on next, a TV set can certainly turn into the operation status.

Similarly, when the AC switch 14-1 is turned off while a TV set is in the operation status and the AC switch 14-1 is turned on next, the TV set can surely be in the operation status.

In the manner stated above, a TV set can improve its operational efficiency by turning off the main power supply switch by remote control transmitter operation, either in the stand-by status or in the operation status. Besides, it can be put in the operation status without fail when the main power supply switch is turned on again after being turned off. Moreover, since the commercial power source is completely cut off by turning off of the main power supply switch, electric power is not consumed.

Further, the circuit shown in FIG. 7 operates in a similar manner to that described in FIGS. 3(*a*) and (*b*) when a power failure occurs while a TV set is in the operation status or the stand-by status (when the interlocking switch 14A is ON) and the power is restored from the power failure later. Therefore, the TV set turns into the stand-by status without fail, ensuring safety and economy when the user is absent.

When turning on of the interlocking switch 14A is desired again after it is turned off, the user can turn it on by manually pressing the manual actuation part 14-4.

Figure 9:
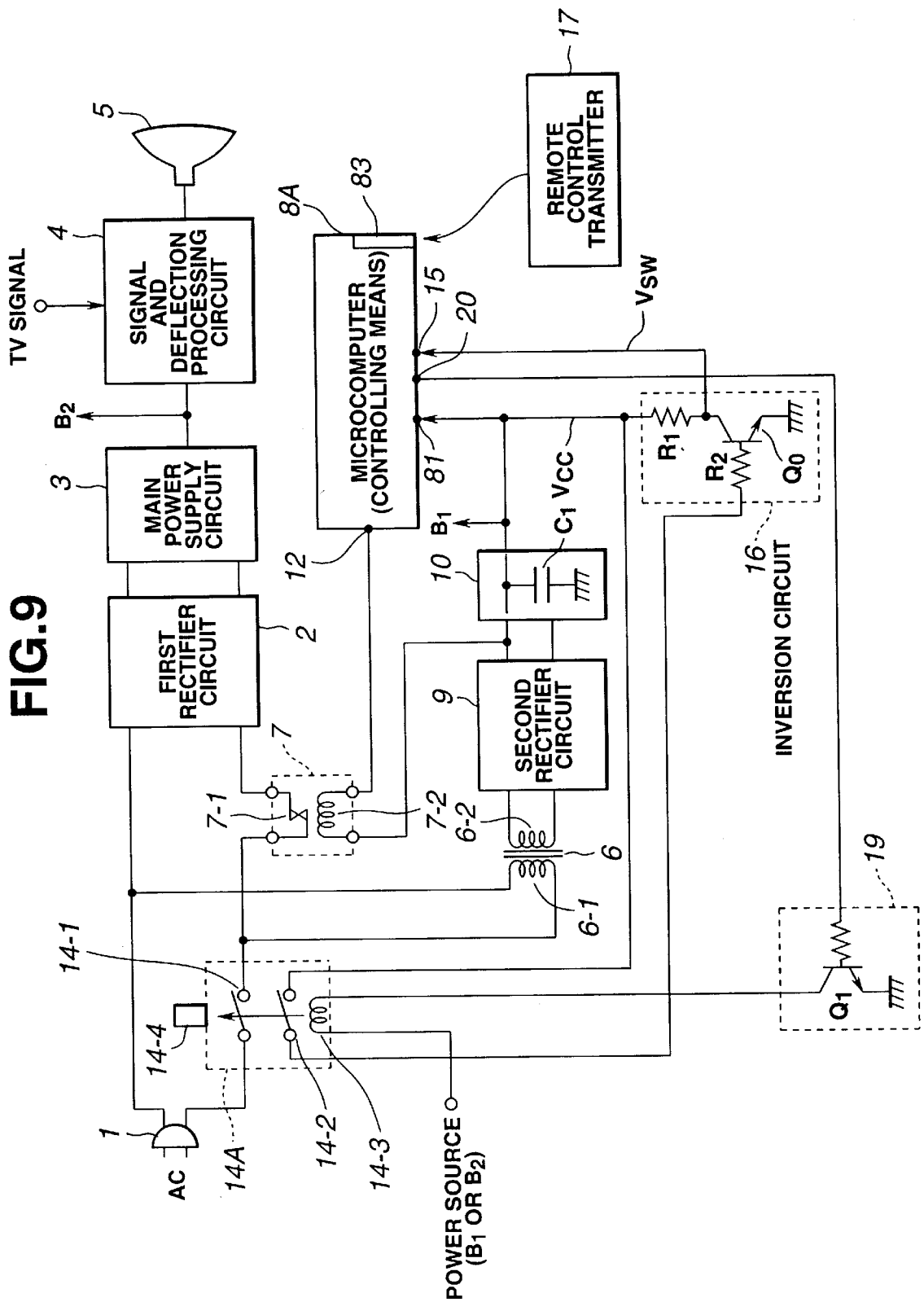
FIG. 9 is a block diagram showing a power supply circuit for an electric device according to a fifth embodiment of the present invention.

FIG. 9 is a block diagram showing a power supply circuit for an electric device according to a fifth embodiment of the present invention. This embodiment is configured so that the interlocking switch 14 shown in a second embodiment of FIG. 4 can be turned off using the remote control transmitter 17. For the interlocking switch 14A, a switch which is constituted as shown in FIG. 8 may be used.

In FIG. 9, points different from FIG. 4 are: the interlocking switch 14 in FIG. 4 is replaced with the interlocking switch with solenoid 14A; turning off of the interlocking switch 14A became possible by supplying drive electric current to the solenoid coil 14-3 using the switch circuit 19 for drive according to control signals from the microcomputer 8A, that is, all-off (stoppage) of an electric device by the microcomputer 8A became possible; and it became possible that a remote control signal for all-off is transmitted from the remote control transmitter 17 to the light receiving circuit 83 provided in the microcomputer 8A by operating the all-off key provided on the remote control transmitter 17.

The microcomputer 8A, the controlling means, is able to turn off the main power supply switch 14-1 and the second switch 14-2 by giving drive voltage to the solenoid of said interlocking switch with solenoid (electromagnet) 14A according to the operation of the all-off key on the remote control transmitter 17, the remote operating means. It is also able to control turning ON/OFF of the stand-by switch 7 according to the operation of the power key on the remote control transmitter 17. Other configuration is similar to that in the embodiment shown in FIG. 4.

Figure 10:
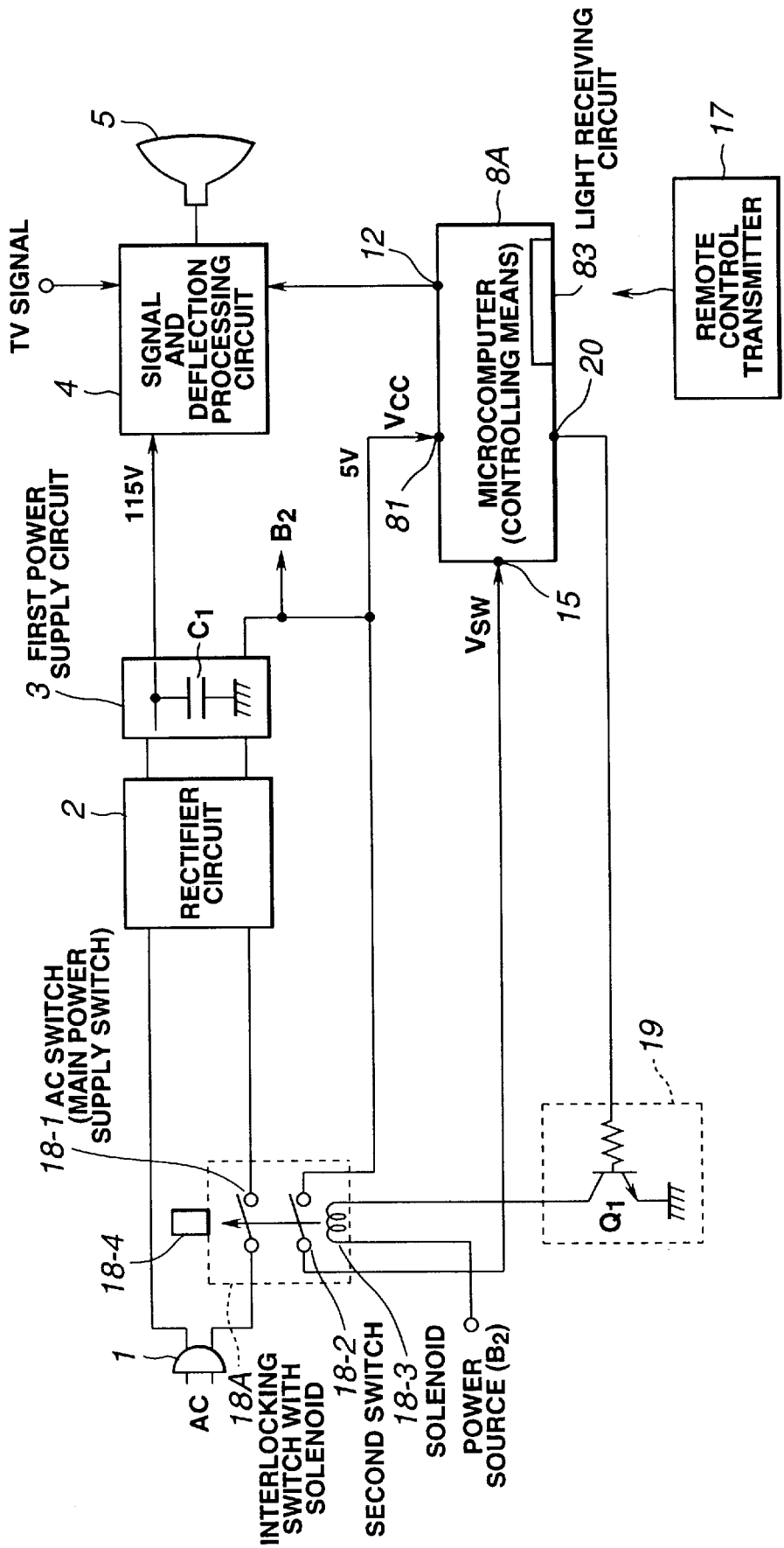
FIG. 10 is a block diagram showing a power supply circuit for an electric device according to a sixth embodiment of the present invention.

FIG. 10 is a block diagram showing a power supply circuit for an electric device according to a sixth embodiment of the present invention. This embodiment is configured so that the interlocking switch 18 shown in a third embodiment of FIG. 6 can be turned off using the remote control transmitter 17. For an interlocking switch 18A, a switch which is constituted similarly to that of the switch 14A shown in FIG. 8 may be used.

In FIG. 10, points different from FIG. 6 are: the interlocking switch 18 in FIG. 6 is replaced with the interlocking switch with solenoid 18A; turning off of the interlocking switch 18A became possible by supplying drive electric current to a solenoid coil 18-3 using the switch circuit 19 for drive according to control signals from the microcomputer 8A, that is, all-off (stoppage) of an electric device by the microcomputer 8A became possible; and remote control signals for all-off became transmissible from the remote control transmitter 17 to the light receiving circuit 83 in the microcomputer 8A by operating the all-off key provided on the remote control transmitter 17.

The microcomputer 8A, the controlling means, besides it is able to turn off the main power supply switch 18-1 and a second switch 18-2 by giving drive voltage to the solenoid of said interlocking switch with solenoid (electromagnet) 18A according to the operation of the all-off key on the remote control transmitter 17, the remote operating means, is able to control turning ON/OFF of the main circuit part 4 according to the operation of the power key on the remote control transmitter 17. Other configuration is similar to that in the embodiment shown in FIG. 6.

As stated above, a fourth to sixth embodiments realize, in addition to advantages similar to those obtained in a first to a third embodiments, another advantage that it becomes unnecessary to go to an electric device such as a TV set in order to turn off its main power supply switch every time, because the interlocking switch 14A or 18A can be turned off using the remote control transmitter 17 by attaching a solenoid to the interlocking switch 14A or 18A, which turns ON/OFF the power of the commercial power source, for turning it off and by supplying the power to the solenoid according to a signal from the remote control transmitter 17.

As stated above, according to the present invention, operational efficiency of an electric device is improved because an electric device such as a TV set is certain to be put in the operation status when its main power supply switch is turned on next after it is turned off either in the operation status or the stand-by status, by attaching a second switch to the main power supply switch, which turns ON/OFF the commercial power source, so as to be turned ON/OFF interlocking with the main power supply switch and by adding signals to a microcomputer, the controlling means, using this second switch. Moreover, safety and economy of a device during the user's absence are improved because an electric device is put in the stand-by status when a power failure occurs while the device is either in the stand-by status or the operation status and the power is restored from the power failure later. Further, electricity consumption can be reduced to zero by turning off the main power supply.

Although the description has been given on a power supply circuit for a television set in the embodiments described above, the present invention is not limited to TV sets but may also be applied to power supply circuits for electric devices other than TV sets.

The present invention should not be limited only to these embodiments described above but various changes or modification may be made without any departure from the scope and the spirit of the present invention.

What is claimed is:

1. A power supply circuit for an electric device having a main power supply switch and a stand-by switch, comprising:
    a main power supply switch for turning ON/OFF the electric power which is inputted from a commercial power source;
    a stand-by switch which is provided in the subsequent stage of said main power supply switch for turning ON/OFF the power supply to a main power supply circuit;
    a stand-by power supply circuit which is provided in the subsequent stage of said main power supply switch and is able to output a first power supply voltage necessary for a stand-by circuit in an electric device according to the voltage from said commercial power source, and wherein said first power supply voltage falls with a predetermined time constant with turning off of the voltage supply from said commercial power source;
    controlling means which is included in said stand-by circuit, operated by said first power supply voltage, provided with a signal detection terminal and a control terminal to control said stand-by switch, and is able to control turning ON/OFF of said stand-by switch according to the control signals from said control terminal; and
    a second switch which is connected between an output terminal of said stand-by power supply circuit and said signal detection terminal of said controlling means, turned ON/OFF in the manner interlocking with turning ON/OFF of said main power supply switch, and supplies voltage, which varies with turning ON/OFF of said main power supply switch, to the signal detection terminal of said controlling means,
    wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls an electric device so as to be put in the operation status by turning on said stand-by switch according to the stored content in said storing means when said main power supply switch is turned on again.

2. A power supply circuit for an electric device according to claim 1, comprising polarity inverting means for inverting the polarity of voltage which varies with the interlocked operation of said second switch and supplying it to said signal detection terminal of said controlling means when said main power supply switch is turned ON/OFF,
    wherein said controlling means is able to store the turning off of said main power supply switch by comparing the voltage of said first power supply voltage which varies with said time constant with the voltage from said inverting means which varies with the interlocked operation of said second switch when said main power supply switch is turned off, and controls an electric device so as to be put in the operation status by turning on said stand-by switch according to the stored content in said storing means when said main power supply switch is turned on again.

3. A power supply circuit for an electric device having a main power supply switch, comprising:
    a main power supply switch for turning ON/OFF the electric power which is inputted from a commercial power source;
    a first power supply circuit which is provided in the subsequent stage of said main power supply switch and is able to output a first power supply voltage necessary for a main circuit part in an electric device according to the voltage from said commercial power source and also able to output a second power supply voltage required for a stand-by circuit in the electric device, and wherein said second power supply voltage falls with a predetermined time constant with turning off of the voltage supply from said commercial power source;

controlling means which is included in said stand-by circuit, operated by said second power supply voltage, provided with a signal detection terminal and a control terminal for controlling said main circuit part, and able to control turning ON/OFF of said main circuit part using control signals from said control terminal; and a second switch which is connected between an output terminal of second power supply voltage of said first power supply circuit and said signal detection terminal of said controlling means, turned ON/OFF in the manner interlocking with turning ON/OFF of said main power supply switch, and supplies voltage which varies with turning ON/OFF of said main power supply switch to said signal detection terminal of the controlling means, wherein said controlling means is able to store the turning off of said main power supply switch in a storing means by comparing voltage of said first power supply voltage which varies with said time constant with voltage of said signal detection terminal which varies with the interlocked operation of said second switch when said main power supply switch is turned off, and controls an electric device so as to put it in the operation status by turning on said main circuit part according to the stored content in said storing means when said main power supply switch is turned on again.

4. A power supply circuit for an electric device having a main power supply switch and a stand-by switch, comprising:

a main power supply switch for turning ON/OFF of the electric power inputted from a commercial power source;

a stand-by switch which is provided in the subsequent stage of said main power supply switch for turning ON/OFF the power supply to a main power supply circuit;

a stand-by power supply circuit which is provided in the subsequent stage of said main power supply switch and is able to output a first power supply voltage required for a stand-by circuit in an electric device according to the voltage from said commercial power source, wherein said first power supply voltage falls with a predetermined time constant with turning off of the voltage supply from said commercial power source;

controlling means which is included in said stand-by circuit and operated by said first power supply voltage, and has a signal detection terminal and a control terminal to control said stand-by switch, and is able to control turning ON/OFF of said stand-by switch according to control signals from said control terminal; and a second switch which is connected between an output terminal of said stand-by power supply circuit and said signal detection terminal of said controlling means, turned ON/OFF interlocking with said main power supply switch, and supplies voltage which varies with turning ON/OFF of said main power supply switch to said signal detection terminal of said controlling means, wherein said main power supply switch and said second switch are configured as an interlocking switch having a driving means, and wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls to put an electric device in the operation status by turning on said stand-by switch according to the stored content in said storing means when said main power supply switch is turned on again, while it is able to control turning ON/OFF of said stand-by switch according to the key operation of a remote operating means, and further able to turn off said main power supply switch and said second switch by giving drive voltage to the driving means of said interlocking switch according to the key operation of the remote operating means.

5. A power supply circuit for an electric device according to claim 4, comprising:

polarity inverting means for inverting the polarity of voltage which varies with the interlocked operation of said second switch and supplying it to said signal detection terminal of said controlling means when said main power supply switch is turned ON/OFF, wherein said controlling means is able to store the turning off of said main power supply switch into a storing means by comparing the voltage of said first power supply voltage which varies with said time constant with the voltage from said inverting means which varies with the interlocked operation of said second switch when said main power supply switch is turned off, and controls an electric device so as to be put in the operation status by turning on said stand-by switch according to the stored content in said storing means when said main power supply switch is turned on again.

6. A power supply circuit for an electric device having a main power supply switch, comprising:

a main power supply switch for turning ON/OFF the electric power inputted from a commercial power source;

a first power supply circuit which is provided in the subsequent stage of said main power supply switch, is able to output a first power supply voltage required for the main circuit part in an electric device according to the voltage from said commercial power source, and also able to output a second power supply voltage required for a stand-by circuit in the electric device, wherein said second power supply voltage falls with a predetermined time constant with turning off of the voltage supply from said commercial power source;

controlling means which is included in said stand-by circuit and operated by said second power supply voltage, has a signal detection terminal and a control terminal for controlling said main circuit part, and is able to control turning ON/OFF of said main circuit part according to control signals from said control terminal; and a second switch which is connected between an output terminal of second power supply voltage of said first power supply circuit and said signal detection terminal of said controlling means, is turned ON/OFF interlocking with said main power supply switch, and supplies voltage which varies with turning ON/OFF of said main power supply switch to said signal detection terminal of said controlling means, wherein said main power supply switch and said second switch are configured as an interlocking switch having a driving means, and wherein said controlling means is able to store the turning off of said main power supply switch in a storing means by comparing the voltage of said first power supply voltage which varies with said time constant with the voltage of said signal detection terminal which varies with the interlocked operation of said second switch when said main power supply switch is turned off, and controls to put an electric device in the operation status by turning on said main circuit part according to the stored content in said storing means when said main power supply switch is turned on again, while it is able to control turning ON/OFF of said main circuit part according to the key operation of a remote operating means, and further able to turn off said main power supply switch and said second switch by giving drive voltage to a driving means of said interlocking switch according to the key operation of a remote operating means.

* * * * *